US010752029B2

(12) United States Patent
Murayama

(10) Patent No.: US 10,752,029 B2
(45) Date of Patent: Aug. 25, 2020

(54) PRINT DATA GENERATION DEVICE, METHOD FOR GENERATING PRINT DATA, PROGRAM, AND PRINTING APPARATUS

(71) Applicant: SEIKO EPSON CORPORATION, Tokyo (JP)

(72) Inventor: Noriaki Murayama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/925,368

(22) Filed: Mar. 19, 2018

(65) Prior Publication Data

US 2018/0272760 A1 Sep. 27, 2018

(30) Foreign Application Priority Data

Mar. 21, 2017 (JP) ................................ 2017-054260

(51) Int. Cl.
*G06K 15/00* (2006.01)
*B41J 11/42* (2006.01)
*B41J 3/407* (2006.01)
*B41J 11/00* (2006.01)

(52) U.S. Cl.
CPC ........... *B41J 11/425* (2013.01); *B41J 3/4075* (2013.01); *B41J 11/003* (2013.01); *B41J 11/008* (2013.01); *B41J 11/0065* (2013.01)

(58) Field of Classification Search
None
See application file for complete search history.

(56) References Cited

U.S. PATENT DOCUMENTS

2001/0035964 A1* 11/2001 Kurashina .............. B41J 3/4075 358/1.1
2003/0077099 A1* 4/2003 Tanaka .................. B41J 3/4075 400/615.2
2008/0093027 A1* 4/2008 Niwa .................... B41J 3/4075 156/387
2014/0055547 A1* 2/2014 Mori ...................... B41J 2/325 347/217
2015/0091966 A1* 4/2015 Nagaoka ............. B41J 11/0075 347/16

FOREIGN PATENT DOCUMENTS

| | | | |
|---|---|---|---|
| CN | 1428252 | A | 7/2003 |
| CN | 1616234 | A1 | 5/2005 |
| CN | 103488444 | A | 1/2014 |
| JP | 2004-130673 | A | 4/2004 |
| JP | 2004-130675 | A | 4/2004 |
| JP | 2005-138556 | A | 6/2005 |
| JP | 2008-229899 | A | 10/2008 |

* cited by examiner

*Primary Examiner* — Huo Long Chen
(74) *Attorney, Agent, or Firm* — Foley & Lardner LLP

(57) ABSTRACT

A print data generation device includes a control unit that generates print data, and the control unit calculates a label length for a label to be printed on the basis of the first print data, acquires a maximum label length, generates first print data in a case in which a calculated label length, which is a label length that is calculated, does not exceed the maximum label length, and generates second print data, the label length of which is equivalent to the maximum label length, in a case in which the calculated label length exceeds the maximum label length.

16 Claims, 12 Drawing Sheets

FIG. 4
L
ABCDEF
30a, 30
L
ABCDEFGHIJKLMNOPQR
30b, 30
L
ABCDE
12345
30c, 30

FIG. 5
Lc
L
ABCDEF
30a, 30
L
ABCDEFGHIJKLMNOPQR
30b, 30
L
ABCDE
12345
30c, 30

PRINT DATA GENERATION DEVICE, METHOD FOR GENERATING PRINT DATA, PROGRAM, AND PRINTING APPARATUS

BACKGROUND

1. Technical Field

The present invention relates to a print data generation device that generates print data for printing labels, and to a method for generating print data, a program, and a printing apparatus.

2. Related Art

In the related art, as disclosed in JP-A-2008-229899, a print data generation device (label creation device), which is configured so as to reduce the label length (character printing label length) of a label to be printed and to suppress unnecessary consumption of character printing tape by generating print data (character printing data) in which the amount of blank space is set on the basis of the length of an affixing area and the calculated character printing length, is known. Additionally, in this paragraph, the bracketed words show the terms used in JP-A-2008-229899.

In the print data generation device of the related art, a case in which the label length, which is obtained by adding the character printing length and the amount of blank space, exceeds the length of the affixing area is not considered. Therefore, in a case in which the calculated label length exceeds the length of the affixing area, it is not possible to create print data in a manner in which the label length of the label to be printed is shorter.

SUMMARY

An advantage of some aspects of the invention is to provide a print data generation device capable of generating print data in a manner in which the label length of the label to be printed is shorter, and to provide a method for generating print data, a program, and a printing apparatus.

According to an aspect of the invention, there is provided a print data generation device including a control unit that generates print data, in which the control unit calculates a label length for a label to be printed on the basis of first print data, acquires a maximum label length, generates the first print data in a case in which a calculated label length, which is a label length that is calculated, does not exceed the maximum label length, and generates second print data, the label length of which is equivalent to the maximum label length, in a case in which the calculated label length exceeds the maximum label length.

According to another aspect of the invention, there is provided a print data generation device including a control unit that generates print data, in which the control unit acquires a maximum label length, generates first print data, calculates a label length for a label to be printed on the basis of the first print data, and generates second print data, the label length of which is equivalent to the maximum label length, in a case in which the calculated label length, which is the label length that is calculated, exceeds the maximum label length.

According to these configurations, since a label is printed on the basis of the first print data in a case in which the calculated label length does not exceed the maximum label length, the label length of a label to be printed is equivalent to the calculated label length, and is shorter than the maximum label length. In addition, since a label is printed on the basis of the second print data in a case in which the calculated label length exceeds the maximum label length, the label length of a label to be printed is equivalent to the maximum label length. Therefore, the label length of a label to be printed is either equivalent to the maximum label length or is shorter than the maximum label length. Accordingly, it is possible to generate print data in a manner in which the label length of a label to be printed is shorter.

In this case, it is preferable that the control unit generate the second print data in a manner in which at least one of a character size of characters to be printed on the label, a typeface of the characters, an amount of character interval of the characters, and an amount of blank space of the label differs from that of the first print data.

According to this configuration, a label to be printed on the basis of the second print data is a label in which at least one of the character size, the typeface, the amount of character interval, and the amount of blank space has been altered from a label to be printed on the basis of the first print data.

In this case, it is preferable that the control unit cause an option for altering the maximum label length and an option for not altering the maximum label length to be displayed in a case in which the calculated label length exceeds the maximum label length, generate the second print data in a case in which the option for not altering the maximum label length is selected from the displayed options, and alter the maximum label length in a case in which the option for altering the maximum label length is selected from the displayed options, and determines whether or not the calculated label length exceeds the maximum label length on the basis of the altered maximum label length.

According to this configuration, an option for altering the maximum label length is selected and the maximum label length is altered in a case in which the calculated label length exceeds the maximum label length, and the first print data is generated when the calculated label length no longer exceeds the maximum label length. Therefore, in a case in which the calculated label length exceeds the maximum label length, it is possible to allow a user to select whether or not to generate the second print data.

In this case, it is preferable that the control unit cause maximum label length information, which shows the maximum label length in order for the calculated label length not to exceed the maximum label length, to be displayed in a case in which the calculated label length exceeds the maximum label length.

According to this configuration, it is possible to allow a user to confirm which value the maximum label length should be altered to in order to prevent the calculated label length from exceeding the maximum label length.

In this case, it is preferable that the control unit cause an option for removing setting of the maximum label length and an option for not removing setting of the maximum label length to be displayed in a case in which the calculated label length exceeds the maximum label length, generate the second print data in a case in which the option for not removing setting of the maximum label length is selected from the displayed options, and not generate the second print data in a case in which the option for removing setting of the maximum label length is selected from the displayed options.

According to this configuration, the second print data is no longer generated when an option for removing setting of the maximum label length is selected and setting of the maximum label length is removed in a case in which the calculated label length exceeds the maximum label length. Therefore, in a case in which the calculated label length exceeds the maximum label length, it is possible to allow a user to select whether or not to generate the second print data.

In this case, it is preferable that the control unit cause an option for altering the width of a printing medium and an option for not altering the width of the printing medium to be displayed in a case in which the calculated label length exceeds the maximum label length.

According to this configuration, in a case in which the calculated label length exceeds the maximum label length and the second print data is generated, it is possible to allow a user to select whether or not to alter the width of the printing medium. Therefore, in a label to be printed on the basis of the second print data, even if a metric of characters in the width direction of the label is small, as a result of an option for altering the width of the printing medium being selected and the width of the printing medium being altered, it is possible to suppress an increase in blank space in the width direction of the label, and therefore, it is possible to obtain a label having favorable appearance.

In this case, it is preferable that the control unit cause an option for altering the typeface to a typeface for which a metric of characters in a length direction of the label is smaller without the dimension of a metric of characters in a width direction of the label being changed, and an option for not altering the typeface to be displayed in a case in which the calculated label length exceeds the maximum label length.

According to such a configuration, in a case in which the calculated label length exceeds the maximum label length and the second print data is generated, it is possible to allow a user to select whether or not to alter to a typeface for which a metric of characters in a length direction of the label is smaller without the dimension of a metric of characters in a width direction of the label being changed. Therefore, as a result of an option for altering the typeface being selected and the typeface being altered, in a label to be printed on the basis of the second print data, it is possible to suppress a reduction in the metric of characters in the width direction of the label and an increase in blank space in the width direction of the label, and therefore, it is possible to obtain a label having favorable appearance.

In this case, it is preferable that the control unit acquire the maximum label length that is common to a plurality of the labels, and determine whether or not the calculated label length exceeds the maximum label length for each of the plurality of labels.

According to this configuration, by acquiring the maximum label length that is common to a plurality of the labels, the label length is equivalent to the maximum label length or shorter than the maximum label length for all of the plurality of the labels to be printed. Accordingly, it is possible to generate print data in a manner in which the label length is reduced for all of a plurality of labels.

According to still another aspect of the invention, there is provided a method for generating print data, in which a print data generation device, which generates print data, calculates a label length for a label to be printed on the basis of first print data, acquires a maximum label length, generates the first print data in a case in which a calculated label length, which is a label length that is calculated, does not exceed the maximum label length, and generates second print data, the label length of which is equivalent to the maximum label length, in a case in which the calculated label length exceeds the maximum label length.

According to still another aspect of the invention, there is provided a method for generating print data, in which a print data generation device, which generates print data, acquires a maximum label length, generates first print data, calculates a label length for a label to be printed on the basis of the first print data, and generates second print data, the label length of which is equivalent to the maximum label length, in a case in which the calculated label length, which is the label length that is calculated, exceeds the maximum label length.

According to still another aspect of the invention, there is provided a program that causes a processor, which a print data generation device that generates print data is provided with, to execute calculating a label length for a label to be printed on the basis of first print data, acquiring a maximum label length, generating the first print data in a case in which a calculated label length, which is a label length that is calculated, does not exceed the maximum label length, and generating second print data, the label length of which is equivalent to the maximum label length, in a case in which the calculated label length exceeds the maximum label length.

According to still another aspect of the invention, there is provided a program that causes a processor, which a print data generation device that generates print data is provided with, to execute acquiring a maximum label length, generating first print data, calculating a label length for a label to be printed on the basis of the first print data, and generating second print data, the label length of which is equivalent to the maximum label length, in a case in which the calculated label length exceeds the maximum label length.

According to still another aspect of the invention, there is provided a printing apparatus including a control unit that generates print data, and a printing unit that prints a label on the basis of the print data, in which the control unit calculates a label length for the label to be printed on the basis of first print data, and acquires a maximum label length, generates the first print data in a case in which a calculated label length, which is a label length that is calculated, does not exceed the maximum label length, and generates second print data, the label length of which is equivalent to the maximum label length, in a case in which the calculated label length exceeds the maximum label length.

According to still another aspect of the invention, there is provided a printing apparatus including a control unit that generates print data, and a printing unit that prints a label on the basis of the print data, in which the control unit acquires a maximum label length, generates first print data, calculates a label length for the label to be printed on the basis of the first print data, and generates second print data, the label length of which is equivalent to the maximum label length, in a case in which the calculated label length, which is the label length that is calculated, exceeds the maximum label length.

According to these configurations, since printing is performed on the basis of print data generated in a manner in which the label length of a label to be printed is shorter, it is possible to lower the consumption amount of a printing medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a print data generation device of the invention and a tape printing apparatus, which is an embodiment of a printing apparatus, will be described.

Figure 1:
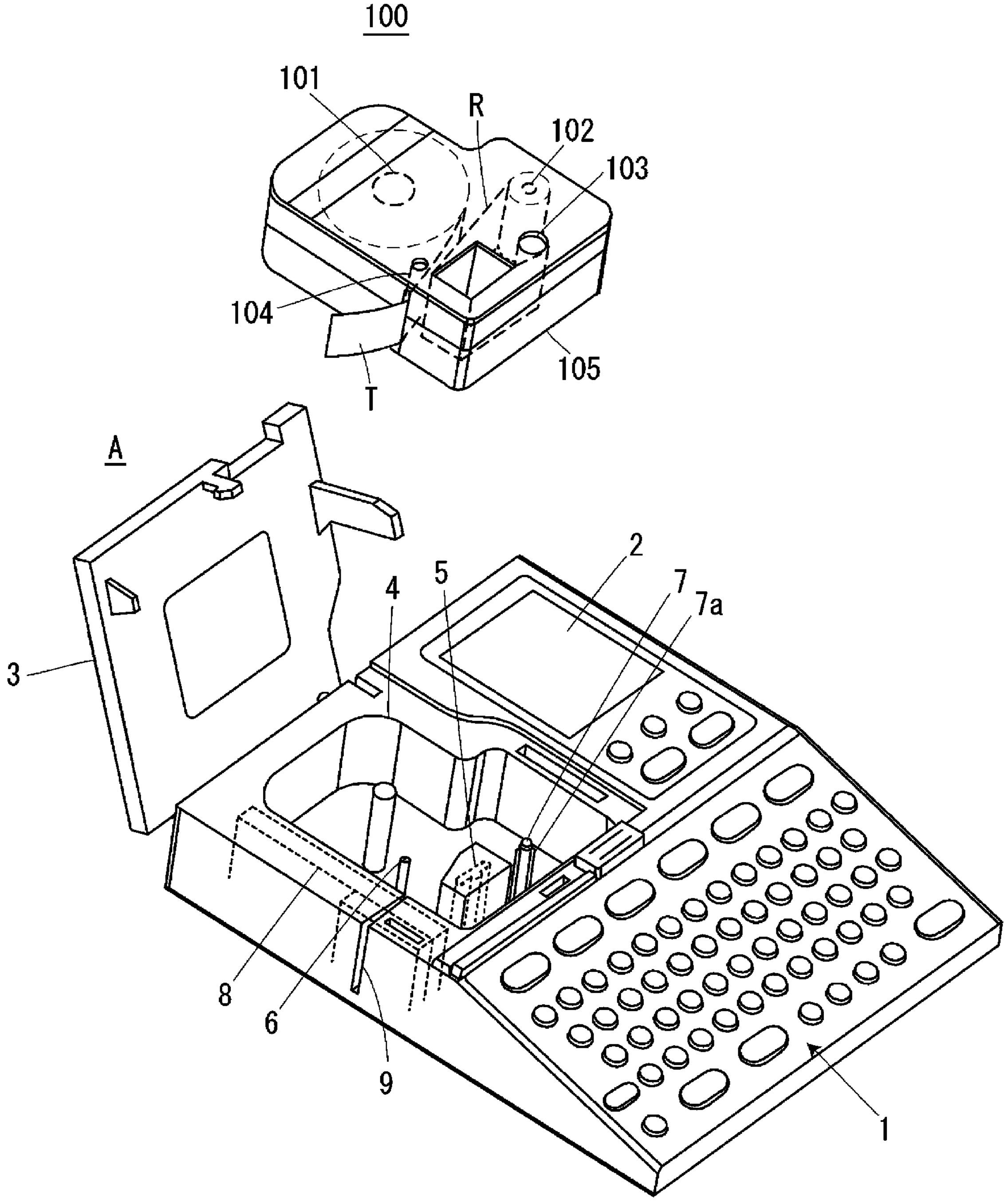
FIG. 1 is a perspective view of a tape printing apparatus according to an embodiment of the invention and a tape cartridge that is mounted in the tape printing apparatus.

A schematic configuration a tape printing apparatus A will be described below on the basis of FIG. 1. The tape printing apparatus A is provided with a manipulation panel 1, a display 2, a cover 3, a cartridge mounting portion 4, a printing head 5, a platen shaft 6, a wind-up shaft 7, and a cutter 8.

In the manipulation panel 1, various buttons such as character buttons, selection buttons, and print buttons are provided, and various operations such as input operations of characters, selection operations of options, and instruction operations of the execution of printing, are received. In this instance, a character is a concept that includes hiragana characters, katakana characters, Chinese characters, roman characters, numerical characters, symbols, pictographs, and the like.

The display 2 displays characters input from the manipulation panel 1. In addition, the display 2 displays various options. Additionally, for example, it is possible to use a liquid crystal display or an organic EL display as the display 2.

The cover 3 opens and closes the cartridge mounting portion 4. The cover 3 is opened and closed when a user attaches or detaches a tape cartridge 100 to the cartridge mounting portion 4, or the like.

The tape cartridge 100 is mounted in the cartridge mounting portion 4 in an attachable and detachable manner. The tape cartridge 100 is provided with a tape core 101, a ribbon reel-out core 102, a ribbon wind-up core 103, a platen roller 104, and a cartridge case 105 in which the above-mentioned components are accommodated. A tape T is wound around the tape core 101 in a rolled form. An ink ribbon R is wound around the ribbon reel-out core 102 in a rolled form. Additionally, a plurality of types of tape cartridge 100 in which the width of the tape T differs are available.

The printing head 5, the platen shaft 6, and the wind-up shaft 7 are provided in the cartridge mounting portion 4.

When the tape cartridge 100 is mounted in the cartridge mounting portion 4, the printing head 5 holds the tape T and the ink ribbon R between itself and the platen roller 104. In this state, the ink of the ink ribbon R is transferred to the tape T as a result of the printing head 5 generating heat.

A platen rotor (not illustrated in the drawings) is provided in the platen shaft 6 in a rotatable manner. When the tape cartridge 100 is mounted in the cartridge mounting portion 4, the platen shaft 6 is inserted into the platen roller 104, and the platen rotor engages with the platen roller 104. In this state, as a result of the platen rotor rotating, the platen roller 104 rotates, and the tape T and the ink ribbon R, which are held between the platen roller 104 and the printing head 5, are fed.

A wind-up rotor 7*a* is provided in the wind-up shaft 7 in a rotatable manner. When the tape cartridge 100 is mounted in the cartridge mounting portion 4, the wind-up shaft 7 is inserted into the ribbon wind-up core 103, and the wind-up rotor 7*a* engages with the ribbon wind-up core 103. In this state, as a result of the wind-up rotor 7*a* rotating, the ribbon wind-up core 103 rotates, and the ink ribbon R that is reeled out from the ribbon reel-out core 102 is wound up onto the ribbon wind-up core 103.

When an instruction for the execution of printing is performed in a state in which the tape cartridge 100 is mounted in the cartridge mounting portion 4, as will be mentioned later, print data is generated, and on the basis of the generated print data, the platen rotor and the wind-up rotor 7*a* rotate and the printing head 5 generates heat. As a result of this, input characters are printed on the tape T that is fed. Tape T on which printed has been performed is fed toward a tape ejection outlet 9.

The cutter 8 is provided between the cartridge mounting portion 4 and the tape ejection outlet 9. The cutter 8 cuts, in the width direction of the tape T, the tape T fed from the tape cartridge 100 mounted in the cartridge mounting portion 4. As a result of this, a section of the tape T on which printing has been completed is severed and ejected from the tape ejection outlet 9. An ejected section of the tape T on which printing has been completed is used as a label 30 (refer to FIG. 4, etc.)

Figure 2:
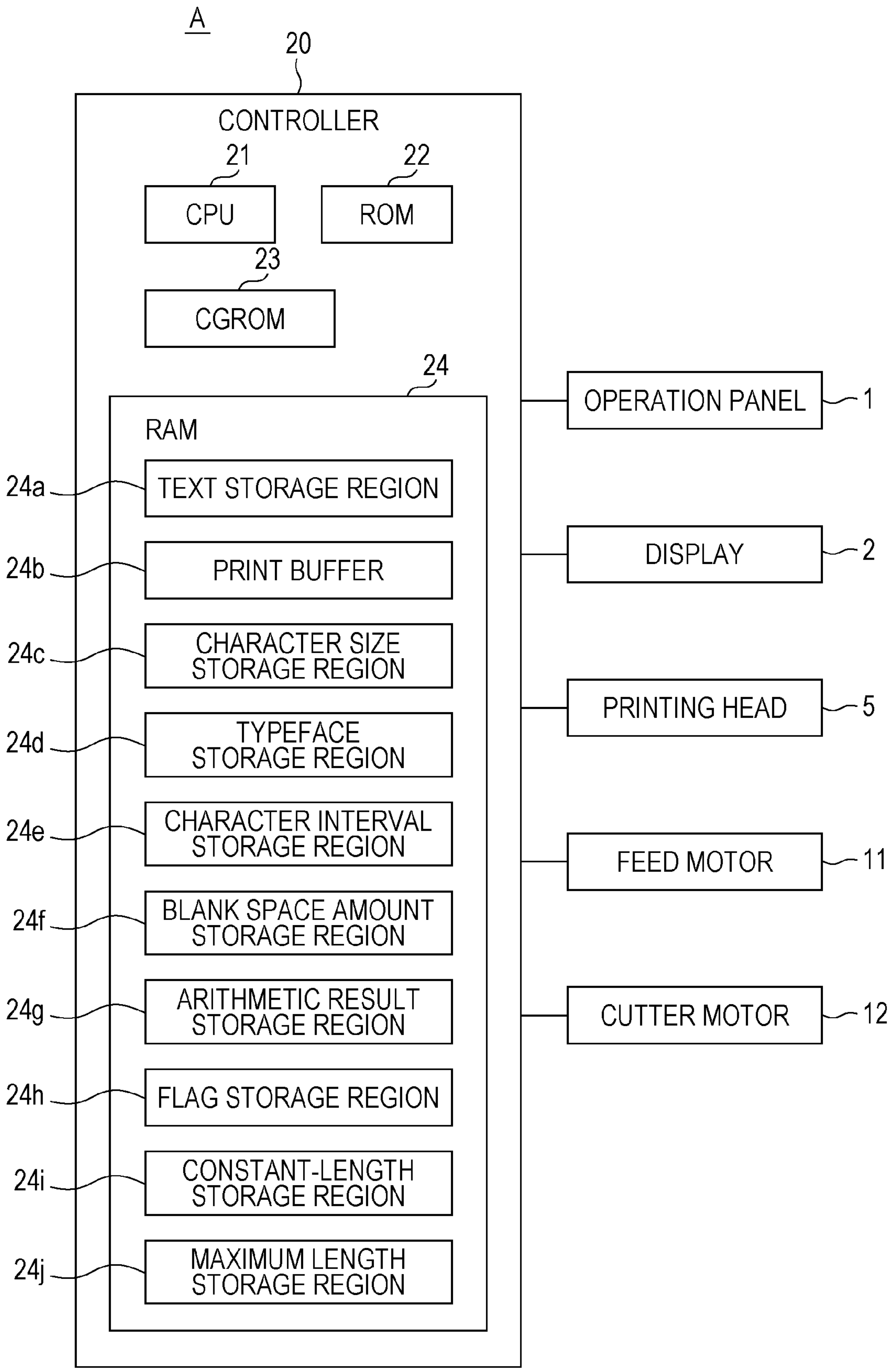
FIG. 2 is a block diagram that shows a control system of the tape printing apparatus.

A control system of the tape printing apparatus A will be described below on the basis of FIG. 2. In addition to the manipulation panel 1, and the like, that are mentioned above, the tape printing apparatus A is provided with a feed motor 11, a cutter motor 12, and a controller 20.

The feed motor 11 is a drive source that causes the platen rotor and the wind-up rotor 7*a* to rotate. The cutter motor 12 is a drive source that causes the cutter 8 to perform a cutting operation. Additionally, the feed motor 11 and the cutter motor 12 may be configured by a single motor in which both functions are combined.

The controller 20 controls each portion of the tape printing apparatus A. That is, the controller 20 outputs a control signal to a driver circuit (not illustrated in the drawings) that drives the display 2, the printing head 5, the feed motor 11, and the cutter motor 2. In addition, an output signal from the manipulation panel 1 is input to the controller 20.

The controller 20 is provided with a Central Processing Unit (CPU) 21, a Read Only Memory (ROM) 22, a Character Generator ROM (CGROM) 23, and a Random Access Memory (RAM) 24.

The CPU 21 reads programs stored in the ROM 22, and executes arithmetic processing using the RAM 24. Various programs are stored in the ROM 22. Dot pattern data for the printing of each character is stored in the CGROM 23 to correspond to character codes that correspond to a plurality of character sizes for each typeface.

A text storage region 24*a*, print buffer 24*b*, a character size storage region 24*c*, a typeface storage region 24*d*, a character interval storage region 24*e*, a blank space amount storage region 24*f*, an arithmetic result storage region 24*g*, a flag storage region 24*h*, a constant-length storage region 24*i*, and a maximum-length storage region 24*j* are provided in the RAM 24.

Character codes that correspond to characters input from the manipulation panel 1 are sequentially stored in the text storage region 24*a*. Dot pattern data sequentially read from the CGROM 23 is sequentially stored in the print buffer 24*b* corresponding to the character codes stored in the text storage region 24*a*. The controller 20 generates print data by sequentially reading, from the CGROM 23, the dot pattern data that corresponds to the character codes stored in the text storage region 24*a*, and rasterizing the read dot pattern data in the print buffer 24*b*. The controller 20 executes printing by controlling the printing head 5, the feed motor 11, and the cutter motor 12 on the basis of the generated print data.

Data of a set character size is stored in the character size storage region 24*c*. Setting of the character size is, for example, performed on the basis of an option selected from options (for example, "large", "medium", "small", etc.) displayed on the display 2. The dimensions of characters to be printed on the label 30 change in accordance with the set character size. Additionally, in a case in which a calculated label length (Ln) exceeds a constant-length label length (Lc) in a constant-length printing process, which will be mentioned later, automatic adjustment to a character size that is smaller than a set character size is performed so as to attain a value at which the calculated label length (Ln) does not exceed the constant-length label length (Lc). In a similar manner, in a case in which a calculated label length (Ln) exceeds a maximum label length (Lmax) in a maximum-length printing process, which will be mentioned later, automatic adjustment to a character size that is smaller than a set character size is performed so as to attain a value at which the calculated label length (Ln) does not exceed the maximum label length (Lmax).

Data of a set typeface is stored in the typeface storage region 24*d*. Setting of the typeface is, for example, performed on the basis of an option selected from options (for example, "Mincho type", "Gothic type", etc.) displayed on the display 2. The typeface of characters to be printed on the label 30 changes in accordance with the set typeface. Additionally, the dimensions of characters to be printed on the label 30 may also change in accordance with the set typeface. For example, when altered from a typeface of a fixed-width font to a typeface of a proportional font, the dimensions of characters in the length direction of the label 30 change.

Data of a set amount of character interval is stored in the character interval storage region 24*e*. Setting of the amount of character interval is, for example, performed on the basis of an option selected from options (for example, "wide", "normal", "narrow", etc.) displayed on the display 2. The dimension of intervals between characters to be printed on the label 30 change in accordance with the set amount of character interval.

Data of a set amount of blank space is stored in the blank space amount storage region 24*f*. Setting of the amount of blank space is, for example, performed on the basis of an option selected from options (for example, "long", "normal", "short", etc.) displayed on the display 2. The dimensions of blank spaces provided in both end portions in the length direction of a label 30 to be printed change in accordance with the set amount of blank space. Additionally, in the constant-length printing process, the dimensions of the blank spaces provided in both end portions in the length direction of a label 30 to be printed are automatically adjusted regardless of the set amount of blank space so that a label length (L) of the label 30 is equivalent to the constant-length label length (Lc). In a similar manner, in the maximum-length printing process, in a case in which the calculated label length (Ln) exceeds the maximum label length (Lmax), the dimensions of the blank spaces provided in both end portions in the length direction of a label 30 to be printed are automatically adjusted regardless of the set amount of blank space so that a label length (L) of the label 30 is equivalent to the maximum label length (Lmax).

An arithmetic result of the CPU 21 is stored in the arithmetic result storage region 24*g* in the manner of a calculated label length (Ln), which will be mentioned later.

Flag data of a constant-length printing flag and flag data of a maximum-length printing flag is stored in the flag storage region 24*h*. The constant-length printing flag is set when the constant-length printing process, which will be mentioned later, is set. The maximum-length printing flag is set when the maximum-length printing process, which will be mentioned later, is set. Setting of the constant-length printing process is, for example, performed as a result of an option for executing the constant-length printing process being selected from an option for executing the automatic-length setting printing process, which will be mentioned later, the option for executing the constant-length printing process, and the option for executing the maximum-length printing process, which are displayed on the display 2. The same applies to setting of the maximum-length printing process.

Data of the constant-length label length (Lc) that is used in the constant-length printing process is stored in the constant-length storage region 24*i*. For example, the constant-length label length (Lc) is set on the basis of an option selected from options displayed on the display 2, or on the basis of a value input into an input field displayed on the display 2.

Data of the maximum label length (Lmax) that is used in the maximum-length printing process is stored in the maximum-length storage region 24*j*. In a similar manner to the constant-length label length (Lc), for example, the maximum label length (Lmax) is set on the basis of an option selected from options displayed on the display 2, or on the basis of a value input into an input field displayed on the display 2.

Figure 3:
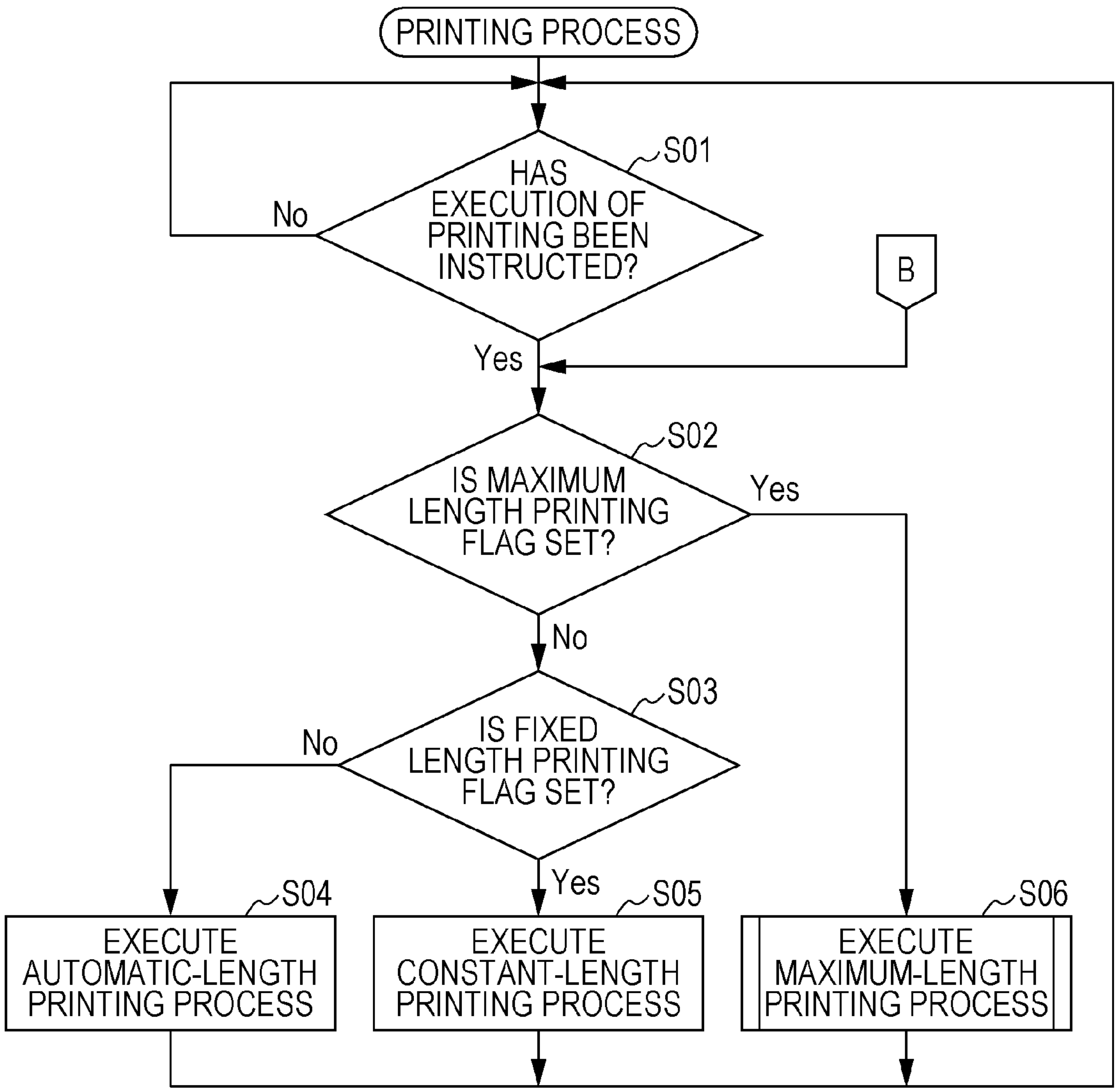
FIG. 3 is a flowchart that shows a flow of a printing process.
Figure 4:
FIG. 4 is a view that shows a label printed by an automatic-length setting printing process.
Figure 5:
FIG. 5 is a view that shows a label printed by a constant-length printing process.
Figure 6:
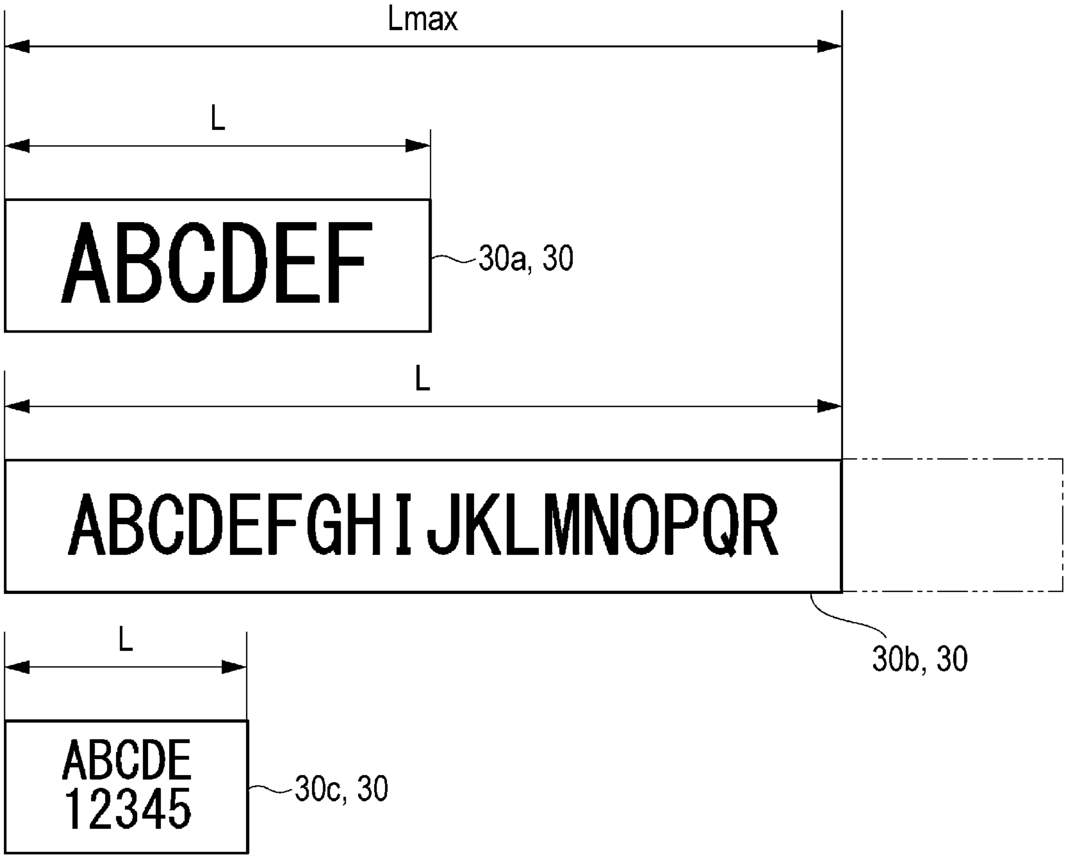
FIG. 6 is a view that shows a label printed by a maximum-length printing process.

A printing process that the controller 20 executes will be described below on the basis of FIG. 3 with reference to FIGS. 4 to 6. The controller 20 executes the printing process as a result of the CPU 21 executing a print control program that is stored in the ROM 22. Additionally, the tape printing apparatus A is provided with a function that prints a plurality of the labels 30 in a single printing process, and in this instance, a case in which three labels 30 are printed in one repetition of the printing process will be described. Hereinafter, a label 30 that is printed first will be referred to as a first label 30*a*, a label 30 that is printed second will be referred to as a second label 30*b*, and a label 30 that is printed third will be referred to as a third label 30*c*. "ABCDEF" is input from the manipulation panel 1 as a character string to be printed on the first label 30*a*, "ABCDEFGHIJKLMNOPQR" is input as a character string to be printed on the second label 30*b*, and "ABCDE" is input as a character string to be printed on a first line of the third label 30*c* and "12345" is input as a character string to be printed on a second line of the third label 30*c*.

In Step S01, the controller 20 determines whether or not an instruction for the execution of printing has been performed on the manipulation panel 1, or more specifically, whether or not a print button has been pressed. In a case in which it is determined that an instruction for the execution of printing has been performed (S01; Yes), the controller 20 advances the process to Step S02. In a case in which it is determined that an instruction for the execution of printing has not been performed (S01; No), the controller 20 repeats Step S01.

In Step S02, the controller 20 determines whether or not the maximum-length printing flag is set by referring to the maximum-length printing flag stored in the flag storage region 24*h*. In a case in which it is determined that the maximum-length printing flag is not set (S02; No), the controller 20 advances the process to Step S03. Meanwhile, in a case in which it is determined that the maximum-length printing flag is set (S02; Yes), the controller 20 advances the process to Step S06.

In Step S03, the controller 20 determines whether or not the constant-length printing flag is set by referring to the constant-length printing flag stored in the flag storage region 24*h*. In a case in which it is determined that the constant-length printing flag is not set (S03; No), the controller 20 advances the process to Step S04. Meanwhile, in a case in which it is determined that the constant-length printing flag is set (S03; Yes), the controller 20 advances the process to Step S05.

In Step S04, the controller 20 executes the automatic-length setting printing process. FIG. 4 shows the first label 30*a*, the second label 30*b*, and the third label 30*c* in a case in which the automatic-length setting printing process is executed. In the manner shown in the drawing, in the automatic-length setting printing process, the label lengths (L) of the labels 30 to be printed may differ for each label 30 depending on the number of characters (m) to be printed on a label 30 (the number of characters (m) of each line in a case in which, in the manner of the third label 30*c*, character strings are printed on a plurality of lines), the metric of characters, and the like. In this case, in a label 30 for which, in the manner of the second label 30*b*, the number of characters (m) to be printed on the label 30 is large since the label length (L) is long, the consumption amount of tape is increased. After Step S04, the controller 20 returns the process to Step S01, and stands by for a subsequent printing execution instruction.

In Step S05, the controller 20 executes the constant-length printing process. FIG. 5 shows the first label 30*a*, the second label 30*b*, and the third label 30*c* in a case in which the constant-length printing process is executed. In the manner shown in the drawing, in the constant-length printing process, the label lengths (L) of the labels 30 to be printed are not dependent on the number of characters (m) to be printed on a label 30, or the like, and the label lengths (L) of the labels 30 are equivalent to the constant-length label length (Lc) stored in the constant-length storage region 24*i*. In this case, in a label 30 for which, in the manner of the first label 30*a* and the third label 30*c*, the number of characters (m) to be printed on the label 30 is small since there is a large amount of blank space at both end portions in the length direction of the tape T, the tape T is consumed unnecessarily. In addition, in the second label 30*b*, since printing is performed at the constant-length label length (Lc), each character printed in a reduced manner in comparison with the second label 30*b* in FIG. 4. Therefore, the characters are small relative to the tape width (there is a large amount of blank space in the width direction of the label 30), and depending on the user, there are cases in which the appearance will be perceived as being poor. After Step S05, the controller 20 returns the process to Step S01.

In Step S06, the controller 20 executes the maximum-length printing process. FIG. 6 shows the first label 30*a*, the second label 30*b*, and the third label 30*c* in a case in which the maximum-length printing process is executed. In the manner shown in the drawing, in the maximum-length printing process, the label lengths (L) of the labels 30 to be printed are equivalent to the maximum label length (Lmax) stored in the maximum-length storage region 24*j*, or are shorter than the maximum label length (Lmax). That is, the label length (L) of the second label 30*b* is equivalent to the maximum label length (Lmax), the label lengths (L) of the first label 30*a* and the third label 30*c* are shorter than the maximum label length (Lmax). In other words, in the maximum-length printing process, the label length (L) of the second label 30*b* is equivalent to the label length (L) of the second label 30*b* in the constant-length printing process. In addition, the label lengths (L) of the first label 30*a* and the third label 30*c* are respectively equivalent to the label lengths (L) of the first label 30*a* and the third label 30*c* in the automatic-length setting printing process.

Accordingly, even in a label 30 for which, in the manner of the second label 30*b*, the number of characters (m) to be printed on the label 30 is large, since the label length (L) does not exceed the maximum label length (Lmax), it is possible to suppress an increase in the consumption amount of the tape T. Additionally, for the purpose of comparison, FIGS. 5 and 6 show, using dashed-two dotted lines, the second label 30*b* that is printed by the automatic-length setting printing process. In addition, in a label 30 for which, in the manner of the first label 30*a* and the third label 30*c*, the number of characters (m) to be printed on the label 30 is small, since the label length (L) is shorter than the maximum label length (Lmax) and there is not a large amount of blank space, it is possible to suppress unnecessary consumption of the tape T. After Step S06, the controller 20 returns the process to Step S01.

Figure 7:
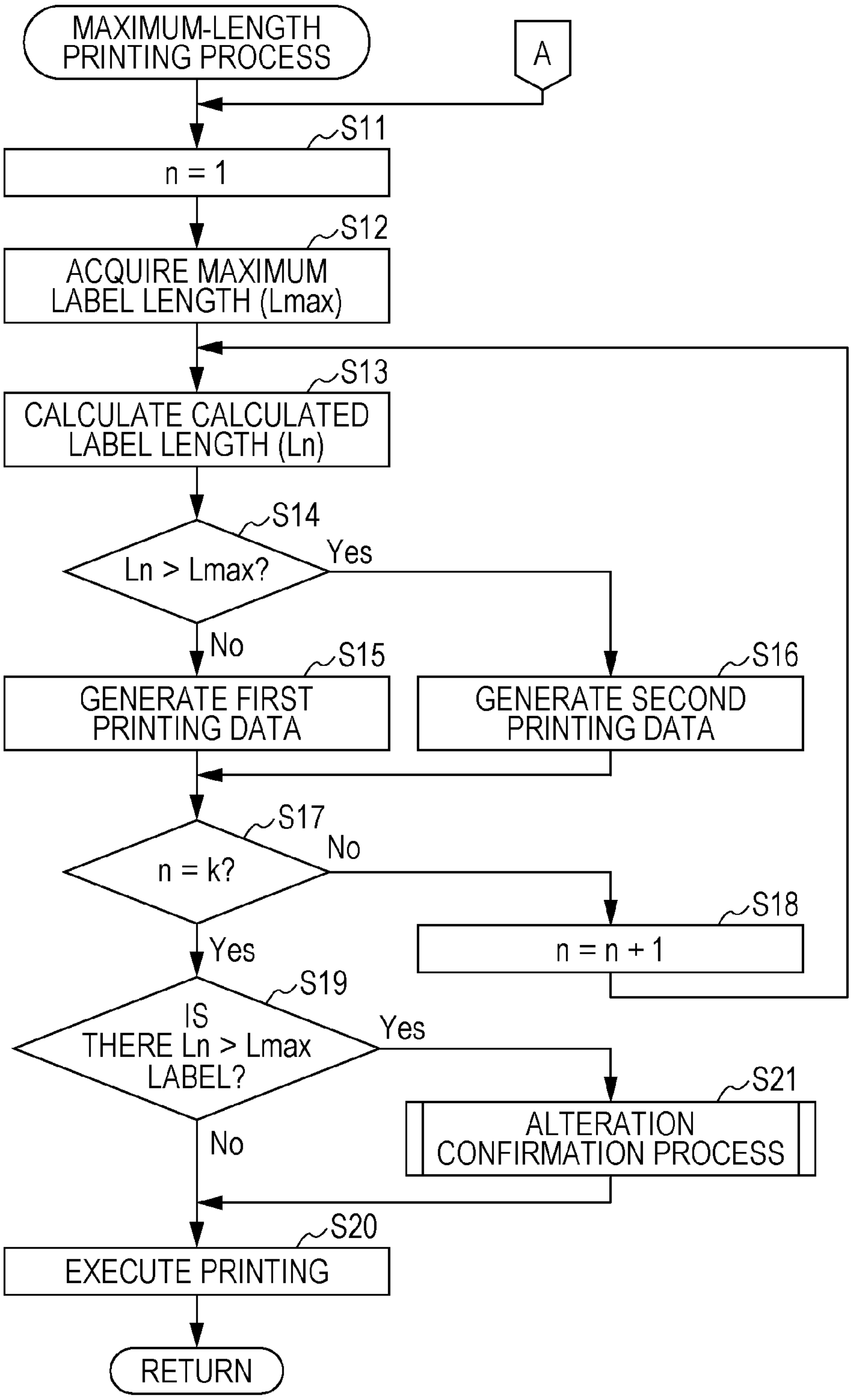
FIG. 7 is a flowchart that shows a flow of the maximum-length printing process.

The maximum-length printing process will be described on the basis of FIG. 7. In Step S11, the controller 20 initializes a variable n to n=1.

In Step S12, the controller 20 acquires the maximum label length (Lmax) by referring to the maximum-length storage region 24*j*.

In Step S13, the controller 20 calculates, on the basis of Formula (1) below, for example, the calculated label length (Ln) of a label 30 to be printed nth on the basis of first print data, which is print data generated in Step S15, which will be mentioned later. The calculated label length (Ln) is stored in the arithmetic result storage region 24*g*.

$$Ln=a\times m+b\times(m-1)+c \quad (1)$$

a: character metric (metric of characters in the length direction of the label 30)

b: character interval dimension (dimension of intervals between characters)

c: blank space dimension (total value of dimensions of blank space respectively provided in both end portions in the length direction of the label 30)

m: number of characters (number of characters of each string in a case in which characters are printed on a plurality of character strings)

The controller 20 acquires a character metric (a) on the basis of data of the character size stored in the character size storage region 24*c* and data of the typeface stored in the typeface storage region 24*d*. The controller 20 acquires a character interval dimension (b) on the basis of data of the amount of character interval stored in the character interval storage region 24*e*. The controller 20 acquires a blank space dimension (c) on the basis of data of the amount of blank space stored in the blank space amount storage region 24*f*. The controller 20 acquires the number of characters (m) on the basis of the number of character codes stored in the text storage region 24*a*.

In Step S14, the controller 20 determines whether or not the calculated label length (Ln) calculated in Step S13 exceeds the maximum label length (Lmax) acquired in Step S12. In a case in which it is determined that the calculated label length (Ln) does not exceed the maximum label length (Lmax) (Step S14; No), the controller 20 advances the process to Step S15.

In Step S15, the controller 20 generates first print data for n labels 30. That is, when dot pattern data corresponding to the character codes stored in the text storage region 24*a* is read from the CGROM 23, the controller 20 reads dot pattern data that corresponds to the character size stored in the character size storage region 24*c* and the typeface stored in the typeface storage region 24*d*. In addition, the controller 20 generates first print data so as to include blank dot data based on data of the amount of character interval stored in the character interval storage region 24*e* and blank dot data based on data of the amount of blank space stored in the blank space amount storage region 24*f*. Therefore, the label length (L) of the labels 30 to be printed on the basis of the first print data is equivalent to the calculated label length (Ln). Additionally, in the automatic-length setting printing process of Step S04, the controller 20 also generates print data in a similar manner to the first print data.

Meanwhile, in a case in which it is determined in Step S14 that the calculated label length (Ln) exceeds the maximum label length (Lmax) (Step S14; Yes), the controller 20 advances the process to Step S16.

In Step S16, the controller 20 generates second print data, the label length (L) of which is equivalent to the maximum label length (Lmax), for n labels 30. That is, the controller 20 generates the second print data, the character size of which is different from that of the first print data. More specifically, the controller 20 generates the second print data by altering the character size stored in the character size storage region 24*c* to a smaller character size, and reading dot pattern data that corresponds to an altered character size.

In addition, the controller 20 generates the second print data by adjusting, regardless of the amount of blank space stored in the blank space amount storage region 24*f*, the number of blank dots in blank space sections so that the label length (L) of the labels 30 to be printed is the maximum label length (Lmax). The label length (L) of the labels 30 to be printed on the basis of the second print data, which is generated in this manner, is equivalent to the maximum label length (Lmax). Additionally, in the constant-length printing process of Step S05, the controller 20 also generates print data in a similar manner to the second print data in a case in which the calculated label length (Ln) exceeds the constant-length label length (Lc).

In Step S17, the controller 20 determines, for the variable n, whether or not n=k is satisfied. k signifies the number of labels 30 to be printed by the printing process, and in this instance k=3. In a case in which it is determined that n=k is not satisfied (S17; No), the controller 20 advances the process to Step S18.

In Step S18, the controller 20 increments the variable n and returns to the process to Step S13.

Meanwhile, in a case in which it is determined in Step S17 that n=k is satisfied (S17: Yes), the controller 20 advances the process to Step S19.

In Step S19, the controller 20 determines whether or not, among the k labels 30, there is at least one label 30 for which the calculated label length (Ln) exceeds the maximum label length (Lmax). In a case in which it is determined that there is not a label 30 for which the calculated label length (Ln) does not exceed the maximum label length (Lmax) (Step S19; No), the controller 20 advances the process to Step S20.

In Step S20, the controller 20 executes printing. That is, the controller 20 executes printing, for the labels 30 for which it was determined in Step S14 that the calculated label length (Ln) does not exceed the maximum label length (Lmax), on the basis of the first print data generated in Step S15. In addition, the controller 20 executes printing, for the labels 30 for which it was determined in Step S14 that the calculated label length (Ln) exceeds the maximum label length (Lmax), on the basis of the second print data generated in Step S16. In the above-mentioned manner, the label length (L) of the labels 30 to be printed on the basis of the first print data is equivalent to the calculated label length (Ln), and is shorter than the maximum label length (Lmax). Meanwhile, the label length (L) of the labels 30 to be printed on the basis of the second print data is equivalent to the maximum label length (Lmax). That is, among the three labels 30 shown in FIG. 6, the first label 30*a* and the third label 30*c* are printed on the basis of the first print data, and the second label 30*b* is printed on the basis of the second print data. After Step S20, the controller 20 returns the process to Step S01 of FIG. 3.

Meanwhile, in a case in which it is determined in Step S19 that there is a label 30 for which the calculated label length (Ln) exceeds the maximum label length (Lmax) (S19; Yes), the controller 20 advances the process to Step S21, and performs an alteration confirmation process.

Figure 8:
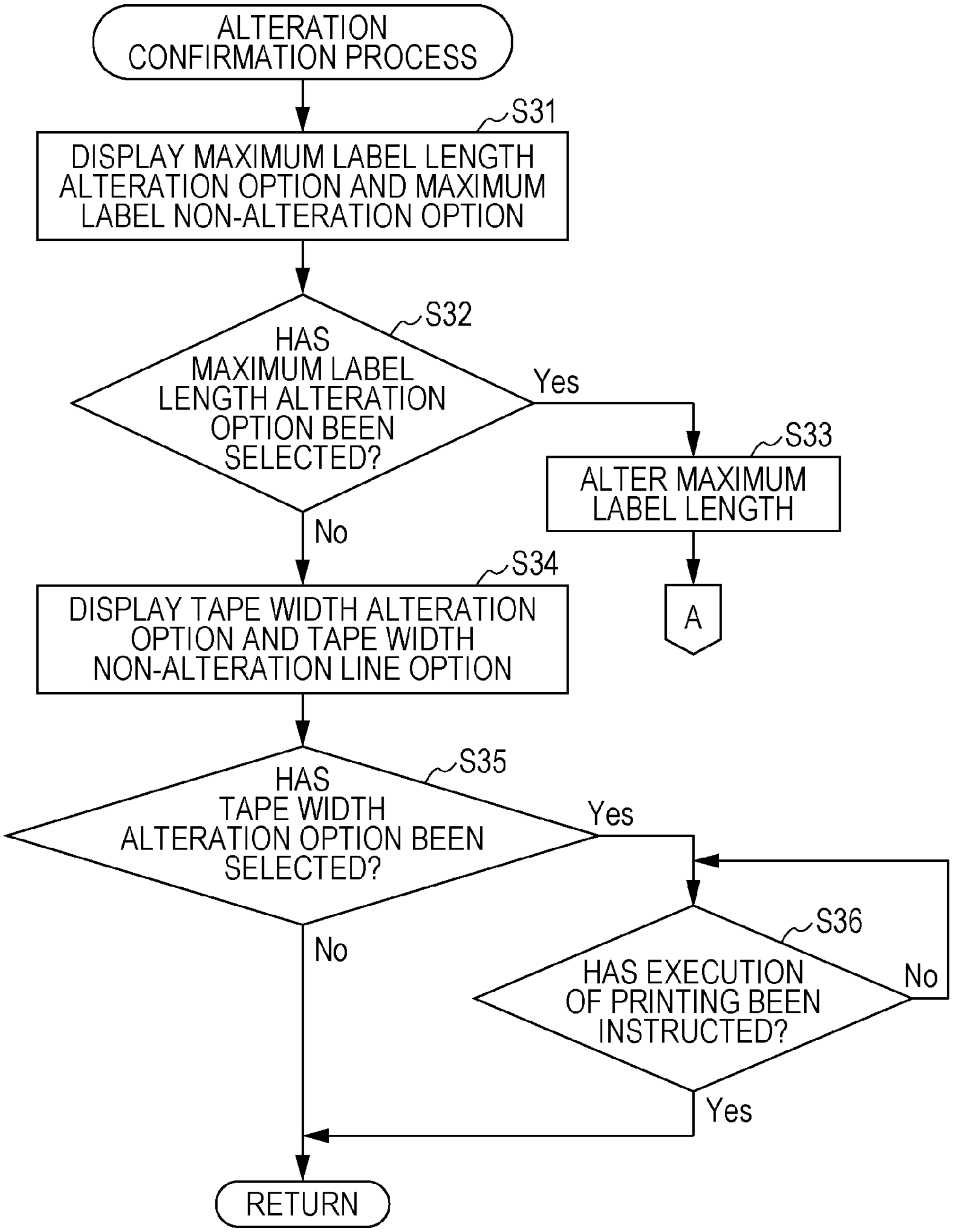
FIG. 8 is a flowchart that shows a flow of an alteration confirmation process.
Figure 9:
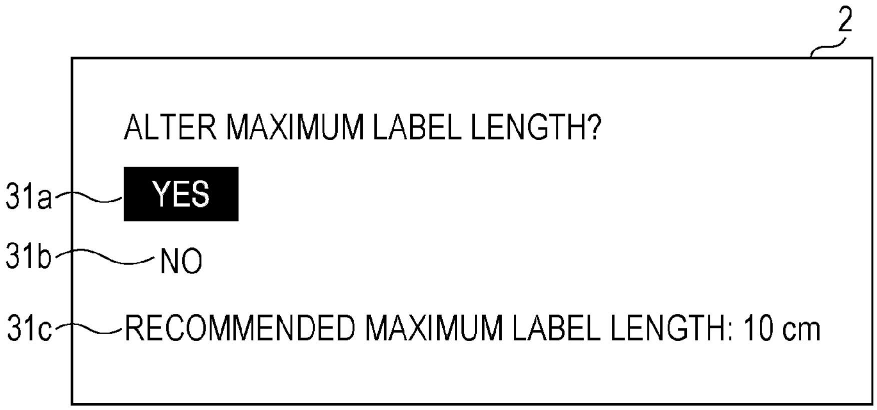
FIG. 9 is a view that shows a maximum label length alteration option and a maximum label length non-alteration option.

The alteration confirmation process will be described below on the basis of FIG. 8 with reference to FIGS. 9 and 10. In Step S31, as shown in FIG. 9, the controller 20 causes a maximum label length alteration option 31*a* and a maximum label length non-alteration option 31*b* to be displayed on the display 2. The maximum label length alteration option 31*a* is an option for altering the maximum label length (Lmax), and the maximum label length non-alteration option 31*b* is an option for not altering the maximum label length (Lmax). Additionally, the option of a selected candidate is displayed on the display 2 in a monochromatically reversed manner.

In addition, the controller 20 causes maximum label length information 31*c* to be displayed on the display 2. The maximum label length information 31*c* shows a maximum label length (Lmax) in order for the calculated label length (Ln) not to exceed the maximum label length (Lmax) as a recommended maximum label length. The recommended maximum label length is a value that is the same as the maximum calculated label length (Ln) among the k labels 30, or a value that is larger than the above-mentioned value. By using the maximum label length information 31*c*, it is possible to allow a user to confirm which value the maximum label length (Lmax) should be altered to in order to prevent the calculated label length (Ln) from exceeding the maximum label length (Lmax).

In Step S32, the controller 20 determines whether or not the maximum label length alteration option 31*a* was selected. In a case in which it is determined that the maximum label length alteration option 31*a* was not selected and the maximum label length non-alteration option 31*b* was selected (S32; No), the controller 20 advances the process to Step S34. Meanwhile, in a case in which it is determined that the maximum label length alteration option 31*a* was selected (S32; Yes), the controller 20 advances the process to Step S33.

In Step S33, the controller 20 alters the maximum label length (Lmax). That is, the controller 20 causes options for the user to select the maximum label length (Lmax), or an input field for input of the maximum label length (Lmax) to be displayed on the display 2. A user performs selection or input of the maximum label length (Lmax) by referring to the maximum label length information 31*c* displayed on the display 2. The controller 20 alters the maximum label length (Lmax) on the basis of an option selected from options displayed on the display 2, or on the basis of a value input into an input field displayed on the display 2. Data of the altered maximum label length (Lmax) is stored in the maximum-length storage region 24*j*. After Step S33, the controller 20 returns to potential to Step S11 of FIG. 7, and in Step S14, determines whether or not the calculated label length (Ln) exceeds the altered maximum label length (Lmax).

In this manner, in the tape printing apparatus A, in a case in which there is a label 30 for which the calculated label length (Ln) exceeds the maximum label length (Lmax), the maximum label length alteration option 31*a* for altering the maximum label length (Lmax) is selected, the maximum label length (Lmax) is altered, and when the calculated label length (Ln) no longer exceeds the maximum label length (Lmax), the first print data is generated. Therefore, in a case in which there is a label 30 for which the calculated label length (Ln) exceeds the maximum label length (Lmax), it is possible to allow a user to select whether or not to generate the second print data.

Figure 10:
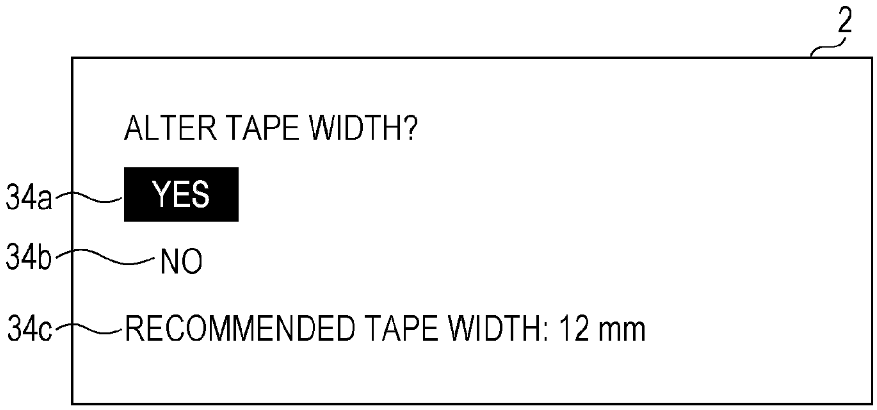
FIG. 10 is a view that shows a tape width alteration option and a tape width non-alteration option.

In Step S34, as shown in FIG. 10, the controller 20 causes a tape width alteration option 34*a* and a tape width non-alteration option 34*b* to be displayed on the display 2. The tape width alteration option 34*a* is an option for altering the width of the tape T. The tape width non-alteration option 34*b* is an option for not altering the width of the tape T.

In addition, the controller 20 causes tape width information 34*c* to be displayed on the display 2. The tape width information 34*c* shows, as a recommend tape width, the width of the tape T when there is a suitable amount of blank space in the width direction of the label 30 in a case in which the metric of characters in the width direction of the label 30 is small for a label 30 to be printed on the basis of the second print data. By using the tape width information 34*c*, it is possible to allow a user to confirm which width the width of the tape T should be altered to in order to prevent there from being a large amount of blank space in the width direction of the label 30 for a label 30 to be printed on the basis of the second print data. Additionally, in a case in which there are labels 30 for which the calculated label length (Ln) does not exceed the maximum label length (Lmax) among the k labels 30, the controller 20 shows a width of the tape T in which characters do not protrude in the width direction of the label 30 in the labels 30 to be printed on the basis of the first print data is shown as the recommend tape width.

In Step S35, the controller 20 determines whether or not the tape width alteration option 34*a* was selected. In a case in which it is determined that the tape width alteration option 34*a* was not selected and the tape width non-alteration option 34*b* was selected (S35; No), the controller 20 returns the process to Step S20 in FIG. 7 and executes printing. Meanwhile, in a case in which it is determined that the tape width alteration option 34*a* was selected (S35; Yes), the controller 20 advances the process to Step S36. In a case in which the tape width alteration option 34*a* was selected, a user alters the width of the tape T by referring to the tape width information 34*c* that is displayed on the display 2. More specifically, the user performs replacement with a tape cartridge 100 in which a tape T having a width that is narrower than that of the tape T accommodated in the tape cartridge 100 that is mounted in the cartridge mounting portion 4 is accommodated.

In Step S36, the controller 20 determines whether or not an instruction for the execution of printing has been performed. In a case in which it is determined that an instruction for the execution of printing has been performed (S36; Yes), the controller 20 returns the process to Step S20 in FIG. 7 and executes printing. Meanwhile, in a case in which it is determined that an instruction for the execution of printing has not been performed (S36; No), the controller 20 repeats Step S36.

In this manner, in the tape printing apparatus A, in a case in which there is a label 30 for which the calculated label length (Ln) exceeds the maximum label length (Lmax) and the second print data is generated, it is possible to allow a user to select whether or not to alter the width of the tape T. Therefore, in a label 30 to be printed on the basis of the second print data, even if the metric of characters in the width direction of the label 30 is small, as a result of the tape width alteration option 34*a* for altering the width of the tape T being selected and the width of the tape T being altered (more specifically, the width of the tape T being made narrower), it is possible to suppress an increase in blank space in the width direction of the label 30, and therefore, it is possible to obtain a label 30 having favorable appearance.

In the above-mentioned manner, the tape printing apparatus A of the present embodiment is provided with the controller 20, which generates print data, and the printing head 5, which prints labels 30 on the basis of the print data. The controller 20 calculates, on the basis of the first print data, the calculated label length (Ln) for a label 30 to be printed. The controller 20 acquires the maximum label length (Lmax). The controller 20 generates the first print data in a case in which the calculated label length (Ln) does not exceed the maximum label length (Lmax). The controller 20 generates the second print data, in which the label length (L) is equivalent to the maximum label length (Lmax), in a case in which the calculated label length (Ln) exceeds the maximum label length (Lmax).

According to this configuration, since a label 30 is printed on the basis of the first print data in a case in which the calculated label length (Ln) does not exceed the maximum label length (Lmax), the label length (L) of a label 30 to be printed is equivalent to the calculated label length (Ln), and is shorter than the maximum label length (Lmax). In addition, since a label 30 is printed on the basis of the second print data in a case in which the calculated label length (Ln) exceeds the maximum label length (Lmax), the label length (L) of a label 30 to be printed is equivalent to the maximum label length (Lmax). Therefore, the label length (L) of a label 30 to be printed is either equivalent to the maximum label length (Lmax) or is shorter than the maximum label length (Lmax). Accordingly, it is possible to generate print data in a manner in which the label length (L) of a label 30 to be printed is shorter. In addition, since printing is performed on the basis of print data generated in a manner in which the label length (L) is shorter, it is possible to lower the consumption amount of the tape T. That is, even in a label 30 for which the number of characters (m) to be printed on the label 30 is large, since the label length (L) does not exceed the maximum label length (Lmax), it is possible to suppress an increase in the consumption amount of the tape T. In addition, in a label 30 for which the number of characters (m) to be printed on the label 30 is small, since the label length (L) are shorter than the maximum label length (Lmax) and there is not a large amount of blank space, it is possible to suppress unnecessary consumption of the tape T.

In addition, in the tape printing apparatus A of the present embodiment, the controller 20 acquires the maximum label length (Lmax) that is common to a plurality of the labels 30. The controller 20 determines, for each of the plurality of labels 30, whether or not the calculated label length (Ln) exceeds the maximum label length (Lmax).

According to this configuration, by acquiring the maximum label length (Lmax) that is common to a plurality of the labels 30, the label length (L) is equivalent to the maximum label length (Lmax) or shorter than the maximum label length (Lmax) for all of the plurality of the labels 30 to be printed. Accordingly, it is possible to generate print data in a manner in which the label length (L) is reduced for all of the plurality of labels 30. In other words, in a case of not being provided with a function of the maximum-length printing process, in order to obtain similar labels 30 to a case and a case in which the maximum-length printing process is executed, it would be necessary for the tape printing apparatus A to print the first label 30*a* by using the automatic-length setting printing process, print the second label 30*b* by using the constant-length printing process, and print the third label 30*c* by using the automatic-length setting printing process. In this case, a user would have the additional labor of having to perform an operation for setting the automatic-length setting printing process or the constant-length printing process each time a single label 30 is printed. In contrast to this, since the tape printing apparatus A of the present embodiment is provided with the function of the maximum-length printing process, as a result of a user merely performing setting of the maximum label length (Lmax), it is possible to obtain a plurality of labels 30 that are printed in a manner in which the label length (L) is as small as possible, and therefore, it is possible to suppress unnecessary consumption of the tape T.

Next, a modification example of the tape printing apparatus A will be described. Additionally, in the following modification example, descriptions of content that is similar to that of the above-mentioned embodiment will be omitted as appropriate, and description will be given focusing on the differences from the above-mentioned embodiment.

Figure 11:
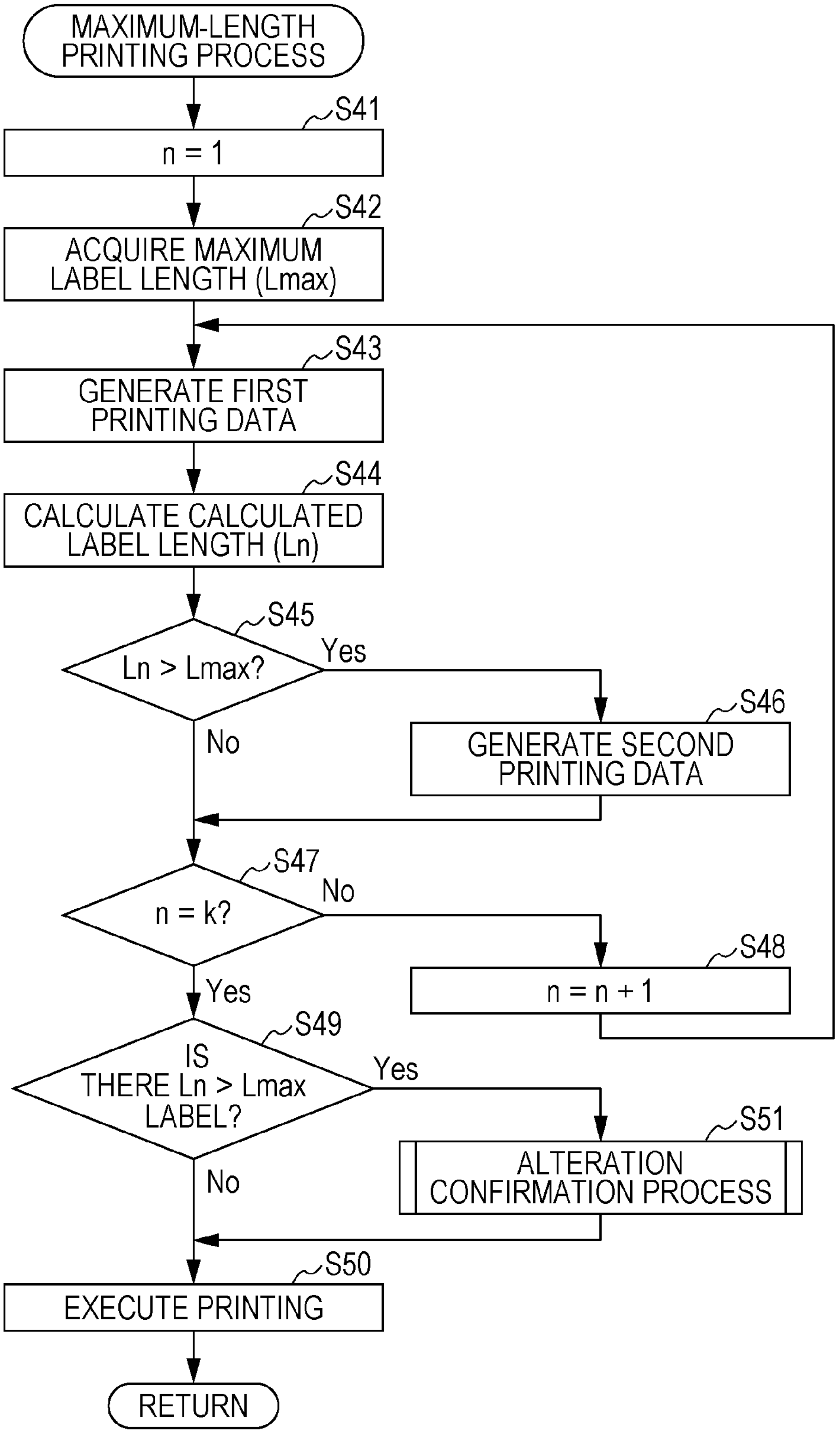
FIG. 11 is a flowchart that shows a flow of a maximum-length printing process according to a first modification example.

A maximum-length printing process that the controller 20 executes in the tape printing apparatus A according to a first modification example will be described below on the basis of FIG. 11. The maximum-length printing process of the first modification example differs from that of the above-mentioned embodiment in that the first print data is generated before determining whether or not the calculated label length (Ln) exceeds the maximum label length (Lmax).

In Step S41, the controller 20 initializes a variable n to n=1.

In Step S42, the controller 20 acquires the maximum label length (Lmax) by referring to the maximum-length storage region 24*j*.

In Step S43, the controller 20 generates first print data for n labels 30.

In Step S44, the controller 20 calculates the calculated label length (Ln) for n labels 30. In this instance, the controller 20 may calculate the calculated label length (Ln) on the basis of Formula (1) in a similar manner to that of step S13. In addition, the controller 20 may calculate the calculated label length (Ln) on the basis of the number of dots in the length direction of the labels 30 in the first print data generated in Step S43.

In Step S45, the controller 20 determines whether or not the calculated label length (Ln) calculated in Step S44 exceeds the maximum label length (Lmax) acquired in Step S42. In a case in which it is determined that the calculated label length (Ln) does not exceed the maximum label length (Lmax) (Step S45; No), the controller 20 advances the process to Step S47. Meanwhile, in a case in which it is determined that the calculated label length (Ln) exceeds the maximum label length (Lmax) (Step S45; Yes), the controller 20 advances the process to Step S46.

In Step S46, the controller 20 generates second print data for n labels 30.

In Step S47, the controller 20 determines, for the variable n, whether or not n=k is satisfied. In a case in which it is determined that n=k is not satisfied (S47; No), the controller 20 advances the process to Step S48.

In Step S48, the controller 20 increments the variable n and returns to the process to Step S43.

Meanwhile, in a case in which it is determined in Step S47 that n=k is satisfied (S47: Yes), the controller 20 advances the process to Step S49.

In Step S49, the controller 20 determines whether or not, among the k labels 30, there is at least one label 30 for which the calculated label length (Ln) exceeds the maximum label length (Lmax). In a case in which it is determined that there is not a label 30 for which the calculated label length (Ln) does not exceed the maximum label length (Lmax) (Step S49; No), the controller 20 advances the process to Step S50.

In Step S50, the controller 20 executes printing. That is, the controller 20 executes printing, for the labels 30 for which it was determined in Step S45 that the calculated label length (Ln) does not exceed the maximum label length (Lmax), on the basis of the first print data generated in Step S43 without generating the second print data. In addition, the controller 20 executes printing, for the labels 30 for which it was determined in Step S45 that the calculated label length (Ln) exceeds the maximum label length (Lmax), on the basis of the second print data generated in Step S46.

Meanwhile, in a case in which it is determined in Step S49 that there is a label 30 for which the calculated label length (Ln) exceeds the maximum label length (Lmax) (S49; Yes), the controller 20 advances the process to Step S51, and performs an alteration confirmation process.

In the above-mentioned manner, the tape printing apparatus A of the first modification example is provided with the controller 20, which generates print data. The controller 20 calculates, on the basis of the first print data, the calculated label length (Ln) for a label 30 to be printed. The controller 20 acquires the maximum label length (Lmax). The controller 20 does not generate the second print data, in which the label length (L) is equivalent to the maximum label length (Lmax), in a case in which the calculated label length (Ln)

does not exceed the maximum label length (Lmax). The controller 20 generates the second print data in a case in which the calculated label length (Ln) exceeds the maximum label length (Lmax). In the tape printing apparatus A of the first modification example, in a similar manner to that of the above-mentioned embodiment, it is possible to generate print data in a manner in which the label length (L) of a label 30 to be printed is shorter, and therefore, it is possible to lower the consumption amount of the tape T.

Figure 12:
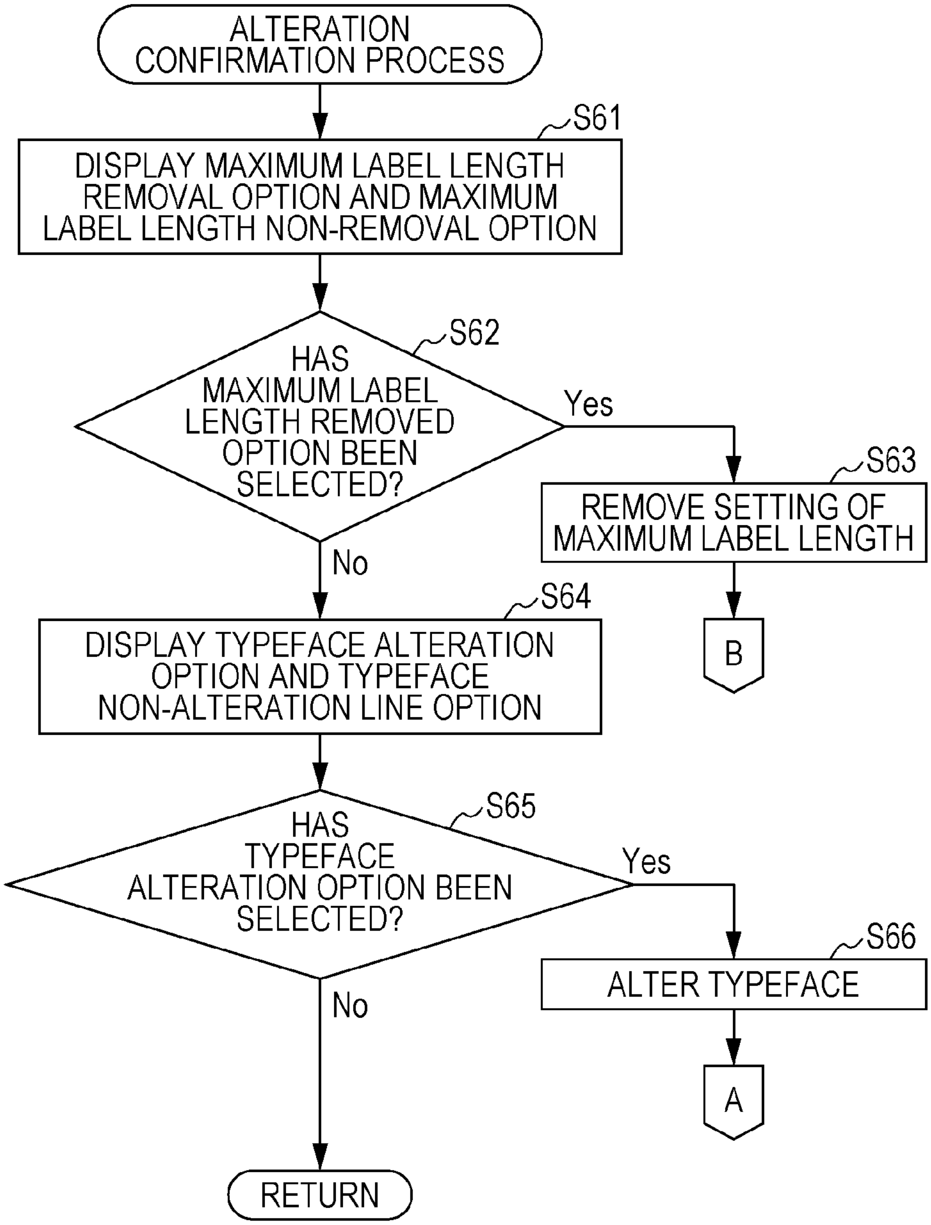
FIG. 12 is a flowchart that shows a flow of an alteration confirmation process according to a second modification example.
Figure 13:
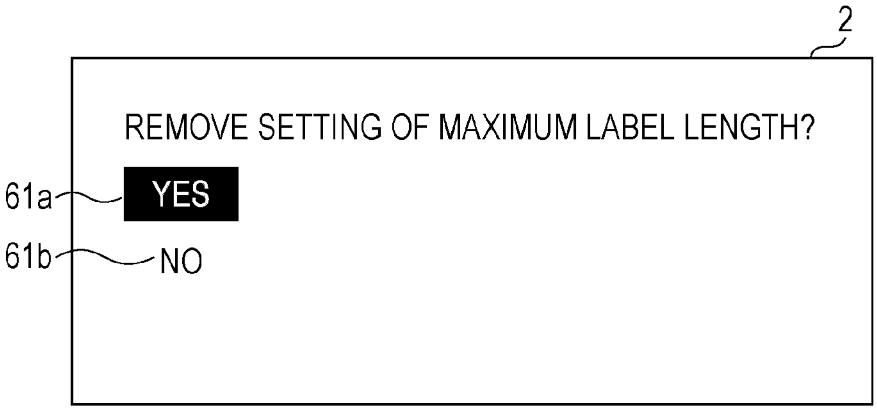
FIG. 13 is a view that shows a maximum label length removal option and a maximum label length non-removal option.
Figure 14:
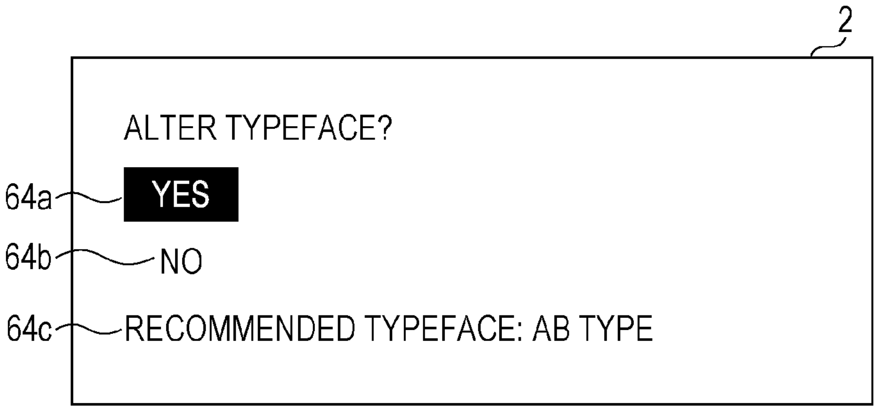
FIG. 14 is a view that shows a typeface alteration option and a typeface non-alteration option.

An alteration confirmation process that the controller 20 executes in the tape printing apparatus A according to a second modification example will be described below on the basis of FIG. 12 with reference to FIGS. 13 and 14. In Step S61, as shown in FIG. 13, the controller 20 causes a maximum label length removal option 61*a* and a maximum label length non-removal option 61*b* to be displayed on the display 2. The maximum label length removal option 61*a* is an option for removing setting of the maximum label length (Lmax) and the maximum label length non-removal option 61*b* is an option for not removing setting of the maximum label length (Lmax).

In Step S62, the controller 20 determines whether or not the maximum label length removal option 61*a* was selected. In a case in which it is determined that the maximum label length removal option 61*a* was not selected and the maximum label length non-removal option 61*b* was selected (S62; No), the controller 20 advances the process to Step S64. Meanwhile, in a case in which it is determined that the maximum label length removal option 61*a* was selected (S62; Yes), the controller 20 advances the process to Step S63.

In Step S63, the controller 20 removes setting of the maximum tape length. That is, the controller 20 resets the maximum-length printing flag stored in the flag storage region 24*h* and resets the maximum label length (Lmax) stored in the maximum-length storage region 24*j*. After Step S63, the controller 20 returns the process to Step S02 of FIG. 3. As a result of this, since the controller 20 executes the automatic-length setting printing process, in a similar manner to the first print data, print data is generated without generating the second print data.

In this manner, in the tape printing apparatus A, in a case in which there is a label 30 for which the calculated label length (Ln) exceeds the maximum label length (Lmax), maximum label length removal option 61*a* for removing setting of the maximum label length (Lmax) is selected, and when setting of the maximum label length (Lmax) is removed, the second print data is no longer generated. Therefore, in a case in which there is a label 30 for which the calculated label length (Ln) exceeds the maximum label length (Lmax), it is possible to allow a user to select whether or not to generate the second print data.

In Step S64, the controller 20 causes a typeface alteration option 64*a* and a typeface non-alteration option 64*b* to be displayed on the display 2. The typeface alteration option 64*a* is an option for altering the typeface to a typeface (hereinafter, referred to as a "small typeface") for which the metric of characters in the length direction of the label 30 is smaller without the metric of characters in the width direction of the label 30 being changed, and the typeface non-alteration option 64*b* is an option for not altering the typeface.

In addition, the controller 20 causes typeface information 64*c* to be displayed on the display 2. The typeface information 64*c* shows one or more small typefaces as a recommend typeface. By using the typeface information 64*c*, it is possible to allow a user to confirm which typeface, from among the typefaces that can be set, should be set in order to ensure that the metric of characters in the width direction of the label 30 is not reduced, that is, to ensure that there is not a lot of blank space in the width direction of the label 30.

In Step S65, the controller 20 determines whether or not the typeface alteration option 64*a* was selected. In a case in which it is determined that the typeface alteration option 64*a* was not selected and the typeface non-alteration option 64*b* was selected (S65; No), the controller 20 returns the process to Step S20 in FIG. 7 and executes printing. In a case in which it is determined that the typeface alteration option 64*a* was selected (S65; Yes), the controller 20 advances the process to Step S66.

In Step S66, the controller 20 alters the typeface. That is, the controller 20 causes options for a user to select the typeface to be displayed on the display 2. The user selects the typeface by referring to the typeface information 64*c* displayed on the display 2. The controller 20 alters the typeface on the basis of a selected typeface. Data of the altered typeface is stored in the typeface storage region 24*d*. After Step S66, the controller 20 returns the process to Step S11 of FIG. 7, and in Step S13, the calculated label length (Ln) is calculated on the basis of a character metric (a) that is altered in accordance with the alteration of the typeface.

In this manner, in the tape printing apparatus A, in a case in which there is a label 30 for which the calculated label length (Ln) exceeds the maximum label length (Lmax) and the second print data is generated, it is possible to allow a user to select whether or not to alter to a typeface for which the metric of characters in the length direction of the label 30 is smaller without the metric of characters in the width direction of the label 30 being changed. Therefore, as a result of the typeface alteration option 64*a* for altering the typeface being selected and altering the typeface, in a label 30 to be printed on the basis of the second print data, it is possible to suppress a reduction in the metric of characters in the width direction of the label 30 and an increase in blank space in the width direction of the label 30, and therefore, it is possible to obtain a label 30 having favorable appearance.

The printing head 5 is an example of a "printing unit". The controller 20 is an example of a "control unit". The CPU 21 is an example of a "processor".

The invention is not limited to the above-mentioned embodiment and the modification example thereof, and naturally, various configurations can be adopted within a range that does not depart from the aim thereof. For example, in addition to configurations mentioned above, the above-mentioned embodiment can be altered to have forms such as those below.

The controller 20 generates the second print data so that the character size or the typeface is different from that of the first print data, but is not limited to this configuration. That is, the controller 20 may generate the second print data so that at least one of the character size, the typeface, the amount of character interval, and the amount of blank space is different from that of the first print data.

The controller 20 is not limited to performing the alteration confirmation process after an instruction for the execution of printing has been performed, and may perform the alteration confirmation process during the input of characters. That is, the controller 20 may calculate the current calculated label length (Ln) and determine whether or not the calculated label length (Ln) that is calculated exceeds the maximum label length (Lmax) each time a character is input. Further, the controller 20 may start the alteration confirmation process in a case in which it is determined that the calculated label length (Ln) exceeds the maximum label length (Lmax).

The form of the maximum label length alteration option 31*a* and the maximum label length non-alteration option 31*b* are not particularly limited, and for example, may be words such as "alter maximum label length" and "do not alter maximum label length". The same applies to the other options.

It is not necessary for the maximum label length information 31*c* to be displayed on the same screen as the screen on which the maximum label length alteration option 31*a* and the maximum label length non-alteration option 31*b* are displayed, and for example, a configuration in which the maximum label length information 31*c* is displayed on a screen for selecting or inputting the maximum label length (Lmax) in a case in which the maximum label length alteration option 31*a* is selected may also be used. The same applies to the tape width information 34*c* and the typeface information 64*c*.

The printing system of the tape printing apparatus A is not limited to a thermal system, and for example, may be an ink jet system, a dot impact system, or an electro-photographic system. The printing medium is not limited to the tape T, and for example, may be a long-form printing medium such as rolled paper. In addition to the tape printing apparatus A, the invention can also be applied to print data generation devices (a personal computer, a smartphone, a tablet terminal, etc.) that output generated print data to an external printing apparatus. In addition, a print control program may be provided housed on a computer-readable recording medium (CD-ROM, flash memory, etc.).

This application claims priority under 35 U.S.C. § 119 to Japanese Patent Application No. 2017-054260, filed Mar. 21, 2017. The entire disclosure of Japanese Patent Application No. 2017-054260 is hereby incorporated herein by reference.

What is claimed is:

1. A print data generation device comprising:

a processor configured to generate print data that includes data for printing a plurality of labels in a single printing process, wherein the processor is further configured to:

calculate a label length for a label to be printed on the basis of first data, acquire, from a region of a storage, a maximum label length that is common to the plurality of labels and is stored in the region of the storage, determine whether the calculated label length exceeds the maximum label length, generate first print data for printing a label such that a length of a printing medium of the printed label is the calculated label length, responsive to determination that the calculated label length does not exceed the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

2. The print data generation device according to claim 1, wherein the processor is further configured to generate the second print data in a manner in which at least one of a character size of characters to be printed on the label, a typeface of the characters, an amount of character interval of the characters, and an amount of blank space of the label differs from that of the first print data.

3. The print data generation device according to claim 2, wherein the processor is further configured to cause an option for altering the typeface to a typeface for which a metric of characters in a length direction of the label is smaller without the dimension of a metric of characters in a width direction of the label being changed, and an option for not altering the typeface to be displayed in a case in which the calculated label length exceeds the maximum label length.

4. The print data generation device according to claim 1, wherein the processor is further configured to cause maximum label length information, which shows the maximum label length in order for the calculated label length not to exceed the maximum label length, to be displayed in a case in which the calculated label length exceeds the maximum label length.

5. The print data generation device according to claim 1, wherein the processor is further configured to:

cause an option for removing setting of the maximum label length and an option for not removing setting of the maximum label length to be displayed in a case in which the calculated label length exceeds the maximum label length, generate the second print data in a case in which the option for not removing setting of the maximum label length is selected from the displayed options, and not generate the second print data in a case in which the option for removing setting of the maximum label length is selected from the displayed options.

6. The print data generation device according to claim 1, wherein the processor is further configured to determine whether or not the calculated label length exceeds the maximum label length for each of the plurality of labels.

7. A print data generation device comprising:

a processor configured to generate print data that includes data for printing a plurality of labels in a single printing process, wherein the processor is further configured to:

acquire, from a region of a storage, a maximum label length that is common to the plurality of labels and is stored in the region of the storage, generate first print data, calculate a label length for a label to be printed on the basis of the first print data, determine whether the calculated label length exceeds the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

8. The print data generation device according to claim 7, wherein the processor is further configured to generate the second print data in a manner in which at least one of a character size of characters to be printed on the label, a typeface of the characters, an amount of character interval of the characters, and an amount of blank space of the label differs from that of the first print data.

9. The print data generation device according to claim 7, wherein the processor is further configured to cause maximum label length information, which shows the maximum label length in order for the calculated label length not to exceed the maximum label length, to be displayed in a case in which the calculated label length exceeds the maximum label length.

10. The print data generation device according to claim 7, wherein the processor is further configured to:

cause an option for removing setting of the maximum label length and an option for not removing setting of the maximum label length to be displayed in a case in which the calculated label length exceeds the maximum label length, generate the second print data in a case in which the option for not removing setting of the maximum label length is selected from the displayed options, and not generate the second print data in a case in which the option for removing setting of the maximum label length is selected from the displayed options.

11. A method for generating print data in a print data generation device, the method comprising:

acquiring, from a region of a storage, a maximum label length that is stored in the region of the storage and is common to a plurality of labels to be printed in a single printing process by the print data generation device;

calculating a label length for a label to be printed on the basis of first data;

determining whether the calculated label length exceeds the maximum label length;

generating first print data for printing a label such that a length of a printing medium of the printed label is the calculated label length, responsive to determination that the calculated label length does not exceed the maximum label length;

generating second print data for printing a label such that a length of a printing medium of the printed label is the maximum label length, responsive to determination that the calculated label length exceeds the maximum label length;

displaying, on a display, an option for altering the maximum label length and an option for not altering the maximum label length, responsive to determination that the calculated label length exceeds the maximum label length;

generating the second print data in a case in which the option for not altering the maximum label length is selected from the displayed options; and altering the maximum label length in a case in which the option for altering the maximum label length is selected from the displayed options, and determining whether or not the calculated label length exceeds the maximum label length on the basis of the altered maximum label length.

12. A method for generating print data in a print data generation device, the method comprising:

acquiring, from a region of a storage, a maximum label length that is stored in the region of the storage and is common to a plurality of labels to be printed in a single printing process by the print data generation device;

generating first print data;

calculating a label length for a label to be printed on the basis of the first print data;

determining whether the calculated label length exceeds the maximum label length;

generating second print data for printing a label such that a length of a printing medium of the printed label is the maximum label length, responsive to determination that the calculated label length exceeds the maximum label length;

displaying, on a display, an option for altering the maximum label length and an option for not altering the maximum label length, responsive to determination that the calculated label length exceeds the maximum label length;

generating the second print data in a case in which the option for not altering the maximum label length is selected from the displayed options; and altering the maximum label length in a case in which the option for altering the maximum label length is selected from the displayed options, and determining whether or not the calculated label length exceeds the maximum label length on the basis of the altered maximum label length.

13. A non-transitory computer readable storage medium storing a program that, when executed by a processor, causes the processor, which a print data generation device that generates print data is provided with, to:

calculate a label length for a label to be printed on the basis of first data, acquire, from a region of a storage, a maximum label length that is stored in the region of the storage and is common to a plurality of labels to be printed in a single printing process by the print data generation device, determine whether the calculated label length exceeds the maximum label length, generate first print data for printing a label such that a length of a printing medium of the printed label is the calculated label length, responsive to determination that the calculated label length does not exceed the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

14. A non-transitory computer readable storage medium storing a program that, when executed by a processor, causes the processor, which a print data generation device that generates print data is provided with, to:

acquire, from a region of a storage, a maximum label length that is stored in the region of the storage and is common to a plurality of labels to be printed in a single printing process by the print data generation device, generate first print data, calculate a label length for a label to be printed on the basis of the first print data, determine whether the calculated label length exceeds the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

15. A printing apparatus comprising:

a processor configured to generate print data that includes data for printing a plurality of labels in a single printing process; and a printing head configured to print a label on the basis of the print data, wherein the processor is further configured to:

calculate a label length for the label to be printed on the basis of first data, and acquire, from a region of a storage, a maximum label length that is common to the plurality of labels and is stored in the region of the storage, determine whether the calculated label length exceeds the maximum label length, generate first print data for printing a label such that a length of a printing medium of the printed label is the calculated label length, responsive to determination that the calculated label length does not exceed the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

16. A printing apparatus comprising:

a processor configured to generate print data that includes data for printing a plurality of labels in a single printing process; and a printing head configured to print a label on the basis of the print data, wherein the processor is further configured to:

acquire, from a region of a storage, a maximum label length that is common to the plurality of labels and is stored in the region of the storage, generate first print data, calculate a label length for the label to be printed on the basis of the first print data, determine whether the calculated label length exceeds the maximum label length, generate second print data for printing a label such that a length of a printing medium of the printed label is the maximum label length, responsive to determination that the calculated label length exceeds the maximum label length, display, on a display, an option for altering the maximum label length and an option for not altering the maximum label length, responsive to determination that the calculated label length exceeds the maximum label length, generate the second print data in a case in which the option for not altering the maximum label length is selected from the displayed options, and alter the maximum label length in a case in which the option for altering the maximum label length is selected from the displayed options, and determine whether or not the calculated label length exceeds the maximum label length on the basis of the altered maximum label length.

* * * * *